March 1, 1960
G. LURY
2,926,426
CALIPER GAUGES, HEIGHT GAUGES AND LIKE INSTRUMENTS
FOR MEASURING DISTANCES ON WORK PIECES
Filed Jan. 15, 1957
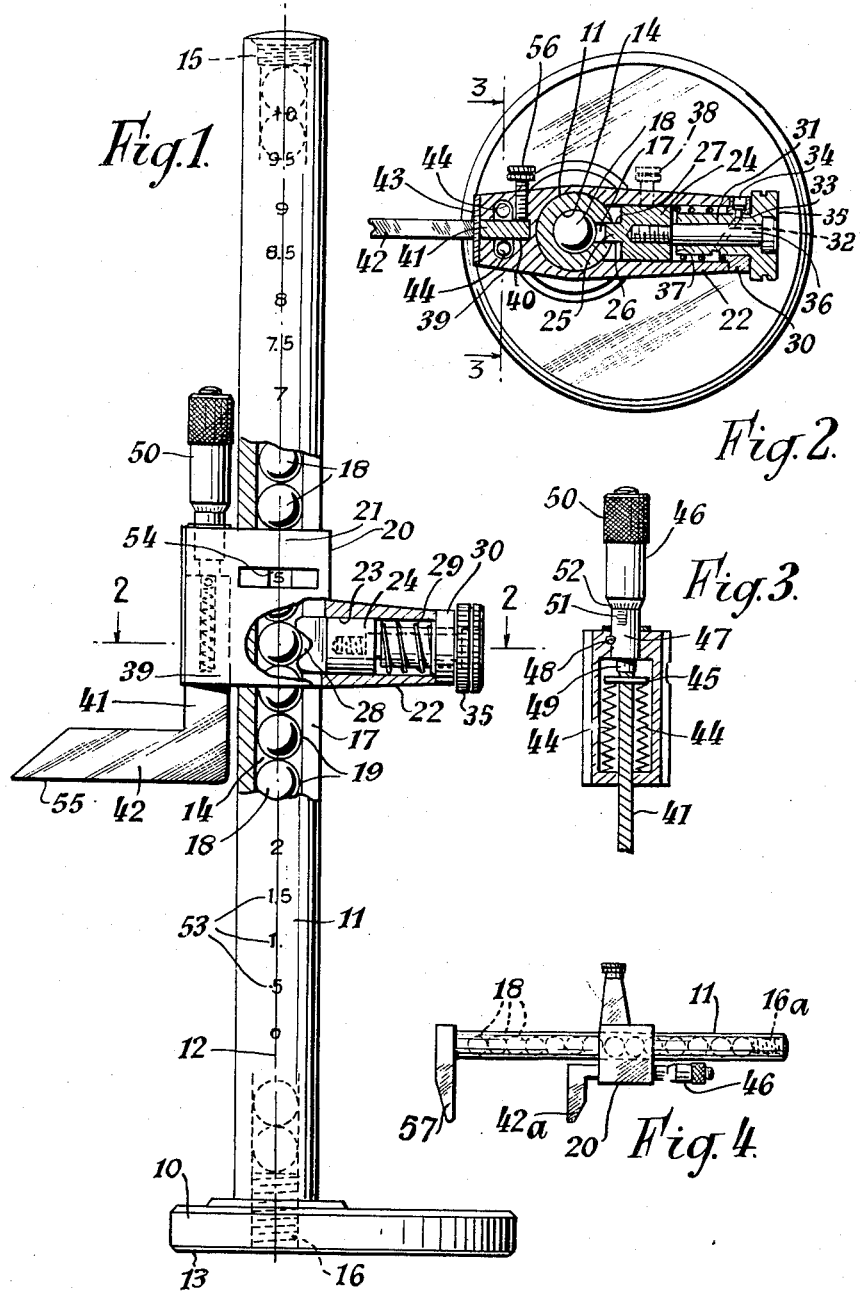
INVENTOR
Guy Lury
BY
Stevens, Davis, Miller, Mosher
ATTORNEY

United States Patent Office 2,926,426
Patented Mar. 1, 1960

2,926,426

CALIPER GAUGES, HEIGHT GAUGES AND LIKE INSTRUMENTS FOR MEASURING DISTANCES ON WORK PIECES

Guy Lury, Horsham, England, assignor to All Precision Engineering Limited, Horsham, England Application January 15, 1957, Serial No. 634,349

Claims priority, application Great Britain March 21, 1956

1 Claim. (Cl. 33—169)

This invention relates to caliper gauges, height gauges and like instruments for measuring distances on work pieces.

It is an object of the invention to provide an improved construction of instrument which is relatively simple to manufacture, but which is capable of giving very accurate results. Moreover the improved instrument is robust and is not likely to be strained or otherwise rendered inaccurate by normal treatment, or even fairly harsh treatment for an instrument of this class.

In an instrument for measuring distances on work pieces, comprising a stem and a carrier member movable therealong, with clamping means for holding said carrier member upon the stem at predetermined positions therealong, an index device being carried by said carrier member, the invention is characterised by the fact that the stem is shaped as a container holding a row of contiguous block-like elements of prescribed length, which elements are constrained against relative movement in a direction longitudinally of the stem and are shaped so that they form a succession of spaced locating points for engagement by the carrier member, the spacing of said points being determined by the lengths of the elements. The stem is provided with element-clamping means which hold the said elements firmly in engagement with one another. Usually the stem is straight and the row of elements extends in a straight line along or parallel with its axis.

Preferably the stem is formed with a longitudinal slot and the carrier member has a locating member which extends through the slot for engagement with the block-like elements.

The invention is illustrated by way of example in the accompanying drawings, in which:

Figure 1 is a side elevaton of a height measuring and scribing gauge, shown partly in section;

Figure 2 is a sectional plan through the carrier device, the section being taken on the line 2—2 of Figure 1;

Figure 3 is a fragmentary sectional elevation taken on the line 3—3 of Figure 2; and Figure 4 is a side elevation of a sliding caliper gauge embodying the invention.

The instrument shown in Figures 1 to 3 comprises a base 10 on which is rigidly mounted a stem 11, the longitudinal axis 12 of the latter being truly perpendicular to the underneath surface 13 of the base. The stem 11 has a longitudinal bore 14 extending for its whole length, the upper end of said bore being closed by a screw-threaded plug 15, while the lower end is also screw-threaded and fitted with a plug 16. The stem is formed with a narrow parallel-sided slot 17 which extends continuously for nearly the whole length of the stem 11, said slot terminating just short of the upper and lower ends of said stem. Into the bore 14 is inserted a row of steel balls 18 which are hardened, ground and lapped to a fine degree of dimensional accuracy, and these balls are maintained in firm mutual engagement by suitably tightening the plug 16 against the lowermost of the balls 18 while the uppermost of said balls abuts against the plug 15. As the balls are a snug sliding fit within the bore 14, the latter supports the row and keeps it straight. It will thus be seen that the stem with its contained row of balls forms a linear scale which is of high accuracy despite its robust construction, for the "crests" 19 of the balls 18, as seen through the slot 17, are mutually spaced with a degree of precision dependent only on the degree of accuracy as regards the diameter and roundness of the individual balls.

A carrier member 20 is arranged to be located by any chosen one of the balls 18; it comprises a sleeve portion 21 which is a close sliding fit on the outside of the stem 11, said sleeve portion having an integral tubular boss 22 extending rearwards horizontally. In the bore 23 of the boss is a plunger 24 which, for the main part of its length is cylindrical to fit the bore snugly, but has at its front a narrow nose portion 25 having flat sides 26, 27 (Figure 2) which fit snugly between the side walls of the slot 17. In side profile the nose portion has a V-shaped notch 28 (Figure 1) which is adapted to straddle any one of the balls 18 (within the working range of the instrument), thus locating the carrier member 20 with great accuracy at the position on said stem corresponding to the chosen ball. The V-notch 28 has such an efficient centering and holding action that resilient means can be used for pressing the plunger into engagement with the ball, and in the arrangement illustrated this force is provided by a coiled compression spring 29 which abuts at its front end against the plunger 24, and at its rear end against a collar 30 rigidly fastened within the mouth of the boss 22. For retracting the plunger 24, when it is desired to change the position of the carrier member 21 on the stem 11, a tubular bush 31 (Figure 2) is rotatable within the collar 30 and is connected thereto by a screw-thread device comprising a helical groove 32 in the outside of the bush, engaged by a spigot 33 on a grub screw 34 projecting radially inwards from the collar 30. The bush 31 has an enlarged circular head 35 by which it can be turned manually, and it is anchored to the plunger 24 by an axial headed screw 36 which is fast in the plunger and upon which the bush is freely rotatable with substantial play in the axial direction. Thus, to retract the plunger 24 the bush 31 is screwed rearwards causing the screw 36 to draw back the plunger 24 against the force of the spring 29. When the bush 31 is turned back to re-lock, the head 35 abuts against the collar 30 while there is still axial clearance at 37 (Figure 2) between the bush 31 and plunger 24. If desired of course the parts may be so designed and adjusted that the bush 31 presses directly against the plunger 24 to hold it positively in its locked position; in this case the spring 29 may be omitted, although it would preferably be retained as it gives a more smooth and pleasant action. A set screw, indicated in broken lines at 38, may be threaded into the side of the boss 22 (Figure 2) to enable the plunger to be held in its locked position.

At its front the sleeve portion 21 is thickened to form an integral block 39, this having a narrow parallel-sided groove 40 extending vertically to receive slidably the upright limb 41 of an L-shaped scriber or other index member 42; the groove 40 is closed by a front cover plate 43. The block 39 is also hollowed to accommodate a pair of light coiled compression springs 44 disposed alongside the limb 41 on opposite sides thereof as shown in Figure 3, these abutting at their upper ends against a transverse pin 45 fast in the upper end of the limb 41 so that they always urge the index member upwards. A screw micrometer head 46 has its body 47 rigidly fastened into the block 39, say by a cotter pin 48, and is arranged so that its plunger 49 forms a movable abutment for the top of the limb 41. Thus, by rotating the thimble 50 of the micrometer head, the index member 42 can be raised and lowered, the displacement being accurately shown by the cooperating micrometer scales 51, 52 in the well known manner. It is desirable that the full range of the micrometer head 46 should be equal to the diameter of the balls 18 forming the block-like elements. For instance the balls can conveniently be half inch (or say 1 cm.) in diameter, in which event the micrometer head would normally run 0–½ inch (or 0–1 cm.). The measurement steps correspondingly to the balls are conveniently inscribed upon the side of the stem 11 as indicated at 53, the relevant figure for the ball engaged by the plunger 24 being visible through an opening 54 formed in the side of the sleeve portion 21. This measurement applies to the height of the underneath surface 55 of the index member above the plane of the base bottom 13, assuming that the micrometer head 46 is set to zero, i.e. its lowest position. As the micrometer thimble 50 is turned to raise the index member, the precise amount of raising is shown by the scales 51, 52, and when added to the figure in the opening 54, the sum gives the new height of the surface 55. A set screw 56 is conveniently provided in the side of the block 39 (Figure 2) for the purpose of gripping the limb 41 and thus locking the index member 42 at any desired setting.

Figure 4 shows the invention applied to a measuring instrument of the caliper gauge type. The general construction is the same as before, the stem 11 being fitted with a slidable carrier member 20 on which a movable jaw 42a is carried, this corresponding to the index member 42 of Figure 1. The stem 11 contains a row of balls 18 or other block-like elements which are held in a firm straight row by an end plug 16a. The movable jaw can thus be adjusted in coarse (but very accurate) steps by engaging the carrier member with the appropriate ball 18, accurate fine adjustment intermediate said steps being achieved by means of the micrometer head 46. A fixed jaw 57 fast on the stem 11 serves as a datum for the measurements.

It will be understood that the above instruments are described by way of example only, and that various modifications may be made to suit requirements. Other forms of block-like element may be used; for instance a succession of cylindrical rollers (not shown) may be contained within the stem to give the coarse measurement steps, the interior of the stem preferably being rectangular in section to fit the rollers accurately. If desired resilient means, such as a spring or spring washer, may be interposed between the row of block-like elements and their clamping means to keep the row tight, even when the parts are subjected to expansion and contraction due to changes of temperature.

I claim:

An instrument for measuring distances on work pieces comprising a cylindrical stem, a carrier member having a circular bore by which it is mounted on said stem to be slidable therealong, a longitudinal bore formed in said stem, an index member on said carrier member for effecting the desired measuring, and locating means for clamping the carrier member to the stem at any selected one of a succession of positions therealong, which locating means comprises a row of circular blocks of prescribed diameter which fit snugly within the bore of the stem and are disposed with their diameters end to end along the axis of the stem, and abutment means pressing against the end circular blocks to maintain the row in firm axial compression, a straight slot which is formed in the stem so as to extend continuously along substantially the whole length of said row of circular blocks and has mutually parallel side walls, a plunger on the carrier member movable radially of the stem, a nose portion on said plunger fitting snugly between said side walls of the slot so as to be slidable therealong without lateral play, whereby said side walls locate the plunger to prevent any movement of the carrier member around the stem, camping means for forcing the plunger radially into the stem, and a V-notch formed in the nose portion of the plunger and defining a pair of mutually inclined fingers arranged to span and engage any chosen single one of the circular blocks, thereby precisely locating the carrier member with respect to the said one block in the direction longitudinally of the stem as the plunger is forced radially into the stem to clamp the carrier member.

References Cited in the file of this patent

UNITED STATES PATENTS

| | | |
|---|---|---|
| 2,144,972 | Hirst | Jan. 24, 1939 |
| 2,338,001 | LaVigne | Dec. 28, 1943 |
| 2,421,440 | Thorpe | June 3, 1947 |